(12) United States Patent
Hickman et al.

(10) Patent No.: US 8,413,692 B1
(45) Date of Patent: Apr. 9, 2013

(54) SEALANT DISPENSER APPARATUS AND METHOD

(75) Inventors: Scott Noble Hickman, Santa Barbara, CA (US); Scott Licking, Pleasant Hill, CA (US); Justin Neel, Santa Rosa, CA (US); Karin Hanzi, San Luis Obispo, CA (US)

(73) Assignee: Illinois Tool Works, Inc., Glenview, IL (US)

( * ) Notice: Subject to any disclaimer, the term of this patent is extended or adjusted under 35 U.S.C. 154(b) by 1018 days.

(21) Appl. No.: 12/247,094

(22) Filed: Oct. 7, 2008

(51) Int. Cl.
*B65B 31/00* (2006.01)

(52) U.S. Cl. .......................... 141/38; 152/415

(58) Field of Classification Search .................... 141/38; 152/415
See application file for complete search history.

(56) References Cited

U.S. PATENT DOCUMENTS

| | | | |
|---|---|---|---|
| 2,689,675 A * | 9/1954 | Stirrup | 222/389 |
| 6,283,172 B1 | 9/2001 | Thurner | |
| 6,412,524 B1 * | 7/2002 | Fogal, Sr. | 141/38 |
| 6,789,581 B2 * | 9/2004 | Cowan et al. | 141/38 |
| 7,021,348 B2 | 4/2006 | Eriksen et al. | |
| 7,694,698 B2 * | 4/2010 | Marini | 141/38 |
| 7,789,110 B2 * | 9/2010 | Marini | 141/38 |
| 7,798,183 B2 * | 9/2010 | Cegelski et al. | 141/38 |
| 7,878,360 B2 * | 2/2011 | Takeda | 220/203.13 |
| 7,891,385 B2 * | 2/2011 | Yanagi et al. | 141/38 |
| 2006/0086403 A1 * | 4/2006 | Kant et al. | 141/38 |
| 2006/0272731 A1 * | 12/2006 | Takeda | 141/38 |
| 2008/0060734 A1 * | 3/2008 | Stehle | 141/38 |

FOREIGN PATENT DOCUMENTS

WO  WO2005/115730  * 12/2005

\* cited by examiner

*Primary Examiner* — Gregory Huson
*Assistant Examiner* — Nicolas A Arnett
(74) *Attorney, Agent, or Firm* — DLA Piper LLP (US)

(57) ABSTRACT

A kit for sealant material that has a container with a piston is provided. The container has a piston with a piston seal and an outlet seal that prevent sealant material from leaking. In one aspect, a method for dispensing sealant is disclosed that uses the contained with a piston.

19 Claims, 7 Drawing Sheets

SEALANT DISPENSER APPARATUS AND METHOD

FIELD

The apparatus and method relate to an apparatus and method for dispensing sealant into an inflatable structure.

BACKGROUND

Various apparatus for injecting a sealant material into a vehicle tire in order to seal the tire after a puncture are well known. Some of the systems also have an air compressor that performs the function of injecting the sealant into the vehicle tire to seal it and then inflating the vehicle tire to the proper pressure once the vehicle tire has been sealed by the sealant. One problem associated with these systems is how to inject the sealant into the vehicle tire. Some systems use gravity fed sealant injection devices, but these systems can not be used to inject sealant for any orientation.

Systems that can inject sealant at any orientation may use various techniques including pistons, bladders or a crushing a soft bottle with pressure. The piston-based sealant injection systems are desirable because the piston generates sufficient force to force all of the sealant out of the sealant container. However, the piston-based injection systems trade off piston sealing effectiveness with pressure drop.

One conventional system solves the problem of pressure drop vs. piston seal friction in a complicated way. In particular, as the piston nears the outlet, a barb punctures the piston which completely separates the piston friction from the pressure drop. However, the problem with this design is that it is complicated and it is very difficult to make a piston that can withstand high pressure without leaking, but at the same time be fragile enough to be punctured. Thus, it is desirable to provide a sealant dispenser that uses a piston, but overcomes the problem of the existing piston-based systems and it is to this end that the apparatus and method are directed.

DETAILED DESCRIPTION OF ONE OR MORE EMBODIMENTS

The apparatus and method are particularly applicable to an apparatus and method for dispensing sealant into an automobile tire and it is in this context that the apparatus and method will be described. It will be appreciated, however, that the apparatus and method have greater utility since the apparatus and method can be used to dispense sealant into various types of inflatable structures.

Figure 1:
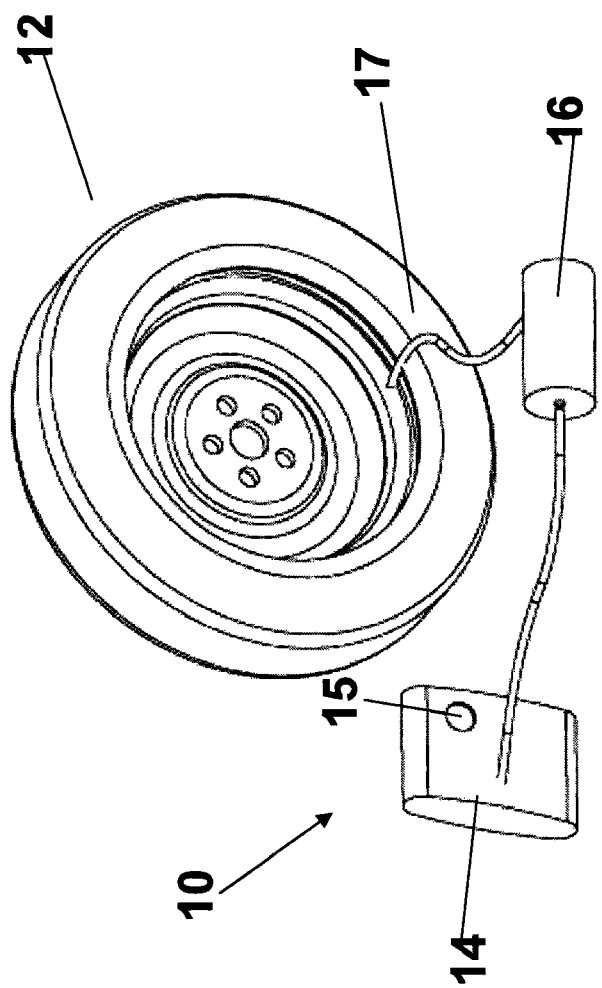
FIG. 1 illustrates a kit that seals and inflates an inflatable structure that may incorporate a sealant dispenser.

FIG. 1 illustrates a kit 10 that seals and inflates an inflatable structure 12, such as a vehicle tire for example, that may incorporate a sealant dispenser 16. The kit 10 may include a source of compressed air 14, such as a battery or electricity powered compressor, connected to the dispenser 16 that dispenses sealant and an outlet hose 17 that directs sealant and/or compressed air into the inflatable structure to seal and inflate the inflatable structure. The kit also has a power source (not shown) that powers the various components of the kit. The kit 10 may also include a gauge 15 that displays the pressure inside of the inflatable structure as described in more detail below. In operation, the compressed air pushes the sealant out of the dispenser into the inflatable structure to seal the inflatable structure and then the compressed air inflates the inflatable structure once it has been sealed. The dispenser 16 may incorporate a piston based sealant dispenser that can be operated at any orientation and has a lower pressure drop between the gauge 15 and the inflatable structure 12. In addition, the kit may incorporate a gauge compensation mechanism and method as described below in more detail to compensate for any pressure drop in the dispenser so that the gauge accurately displays the pressure inside of the inflatable structure. Now, the dispenser is described in more detail.

Figure 2:
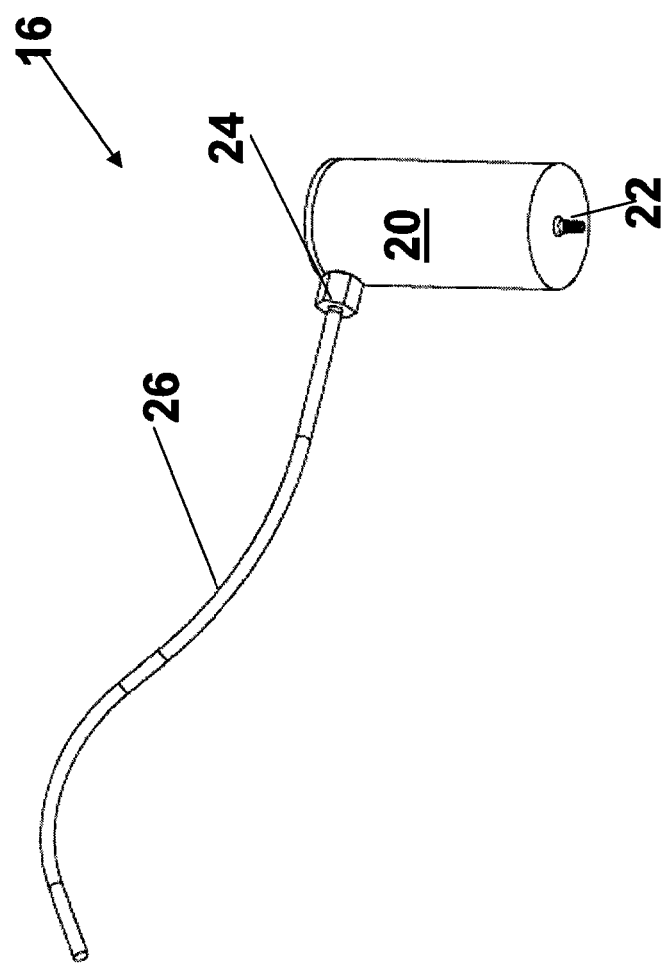
FIG. 2 illustrates more details of the dispenser that is part of the kit shown in FIG. 1.

FIG. 2 illustrates more details of the dispenser 16 that is part of the kit shown in FIG. 1. The dispenser may include an inlet 22 through which compressed air from the source of compressed air 14 or another source is fed into the dispenser 16. The inlet may also prevent sealant in the dispenser from leaking out and prevent sealant from leaking back into the source of compressed air 14. The dispenser may also include a container 20 that holds the sealant when the dispenser contains sealant and may be sufficiently strong to be able to withstand the pressure of the compressed air which is injected into the dispenser. The container 20 may be made out of a low cost plastic, such as nylon, HDPE or polycarbonate and is strong enough to withstand pressures up to 200 psi. The dispenser may also include an outlet 24 that is the exit point from the dispenser for the sealant and/or the compressed air once the dispenser is empty. In one implementation as shown in FIG. 2 and described in more detail with reference to FIGS. 3-6, the inlet 22 may be at an opposite end of the container 20 from the outlet 24. However, the inlet and outlet may also be at other locations on the container relative to each other. The outlet 24 may also include a seal and the seal can take many forms, but for illustration purposes it is shown as a rubber disk in FIG. 3. The seal is pressed into a cylindrical recess in the outlet. The dispenser 16 may also include a hose 26, connected to the outlet 24 that allows sealant and/or air to flow from the dispenser to the inflatable structure being sealed and/or inflated using the kit that contains the dispenser. Now, the operation of the dispenser is described with reference to FIGS. 3-5.

Figure 3:
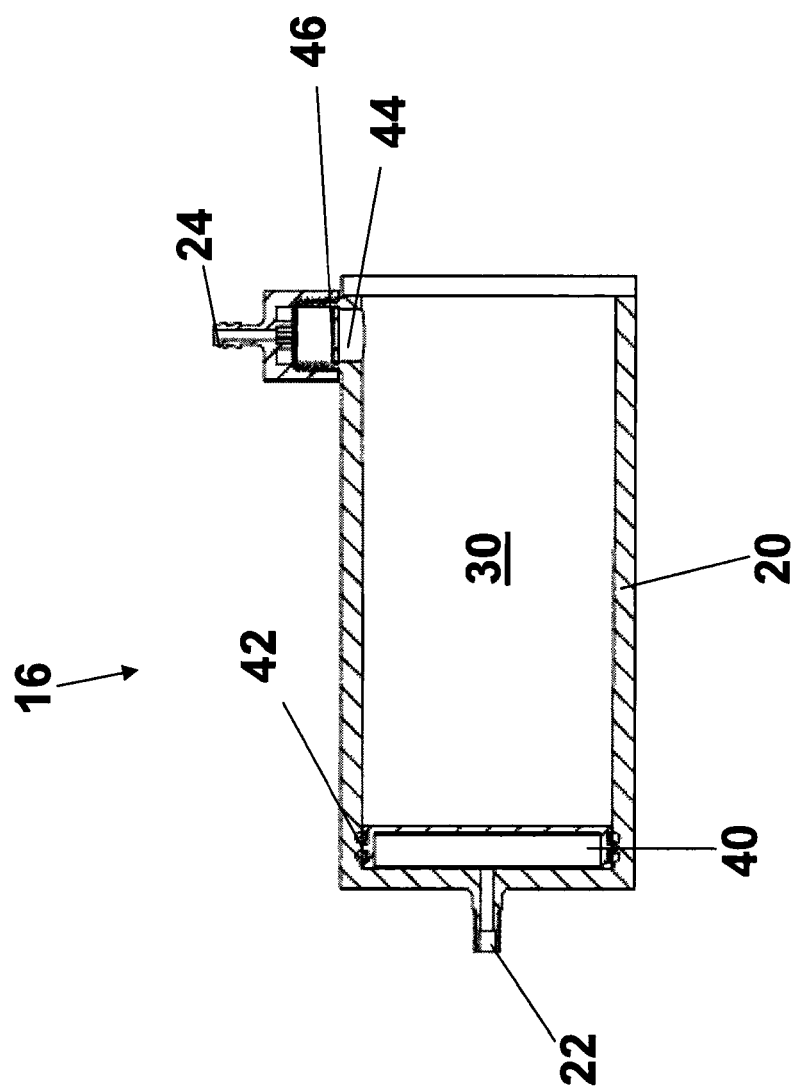
FIG. 3 illustrates the dispenser when it is filled with sealant.
Figure 4:
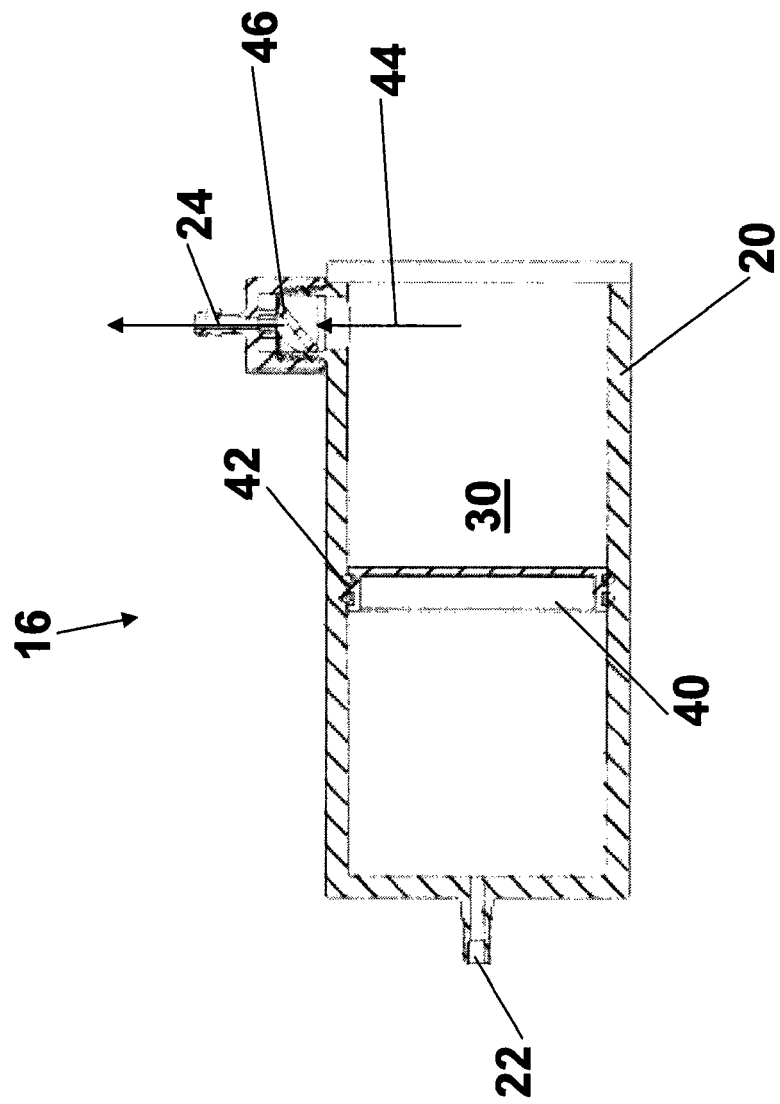
FIG. 4 illustrates the dispenser when it is partially filled with sealant.
Figure 5:
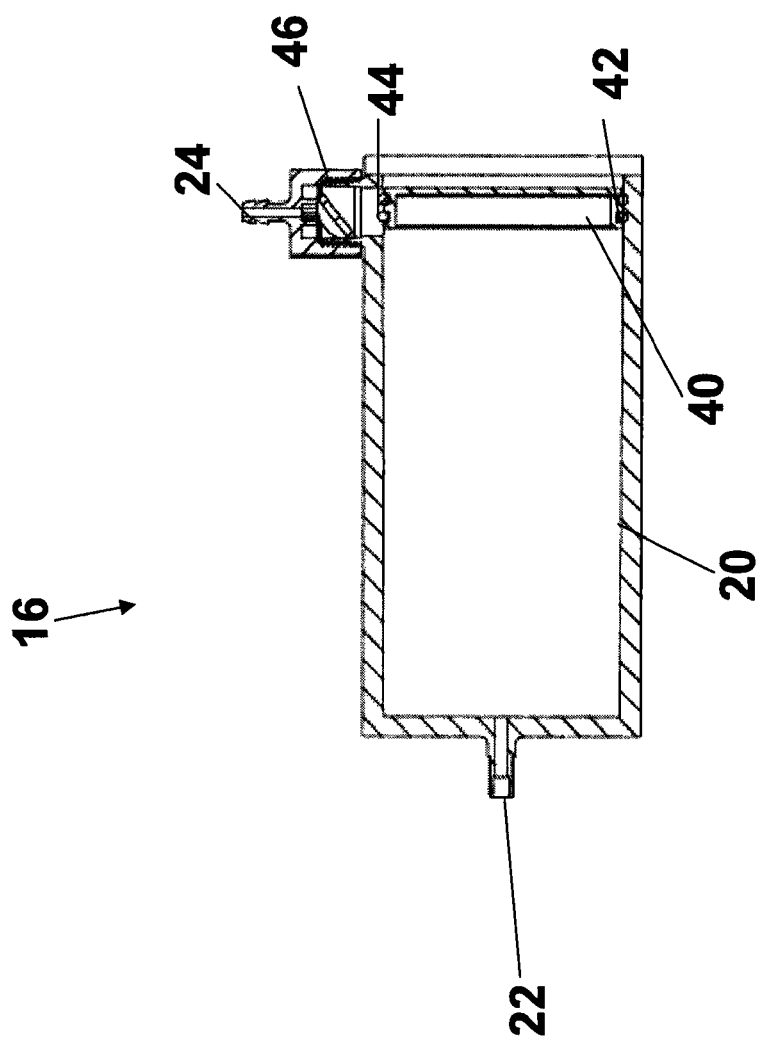
FIG. 5 illustrates the dispenser when it has been emptied of sealant.

FIG. 3 illustrates the dispenser 16 when it is filled with sealant 30, FIG. 4 illustrates the dispenser 16 when it is partially filled with sealant 30 and FIG. 5 illustrates the dispenser 16 when it has been emptied of sealant 30. As shown in these figures, the dispenser may include the container 20 (which is cylindrical in shape in this embodiment) that has a piston 40 with a seal 42, such as for example an O-ring seal, an outlet hole 44 in the container and an outlet seal 46, such as for example a rubber disc seal. As with the embodiment shown in FIG. 2 above, the inlet 22 is at an opposite end of the container from the outlet 24 which allows all of the sealant 30 to be pushed out of the container by the piston. As shown in FIG. 5, the outlet hole 44 in the container is slightly wider that the width of the piston which, when the piston has pushed all of the sealant out of the dispenser, allows the compressed air to flow through the container and exit at the outlet.

In the piston driven dispenser shown, there is a trade-off between "pressure drop" and "sealing effectiveness." Pressure drop is the difference between the gauge pressure at the compressed air source compared with the actual tire pressure and this must be minimized. If the pressure drop is relatively high (and not compensated for as described below), then the gauge does not accurately reflect the actual pressure inside of the inflatable structure and the customer will not inflate their inflatable structure, such as a vehicle tire, to the proper pressure. Alternatively, the seal of the piston, i.e., sealing effectiveness, must prevent leaking over the usable temperature range, but the seal high friction due to a tight seal between the piston and the container in which the piston moves and the pressure drop of the dispenser is affected by the piston's friction. The dispenser shown in FIGS. 3-5 has a lower pressure drop between the gauge 15 of the kit and the inflatable structure 12 (as shown in FIG. 1) due to gradually increasing diameter of the container in the direction of the outlet. Without a gradually increasing diameter, or taper, the piston friction in the cylinder will remain constant. The final pressure drop after all of the sealant is dispensed will be equal to the friction of the piston against the cylinder.

In operation, compressed/pressurized air is injected into the inlet 22. A pressure difference causes the piston 40 to move toward the outlet 24 as shown in FIG. 4. As the pressure builds up in the sealant, the seal 46 is forced open at some pressure and sealant flows out of the outlet as shown in FIG. 4. In one implementation, the pressure to open the seal is between 40 to 80 psi depending on the ambient temperature. When the piston 40 travels the length of the container as shown in FIG. 5, it moves past the outlet hole 44 which allows the compressed/pressurized air to flow out through the outlet hole 44 and inflate the inflatable structure.

Figure 6:
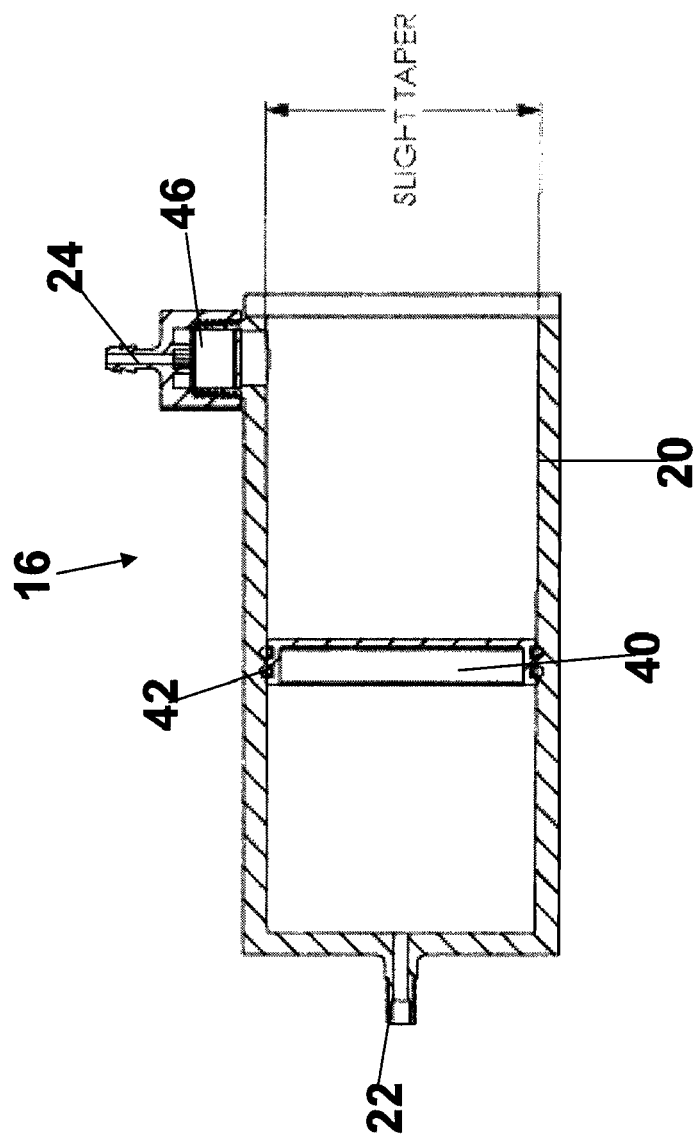
FIG. 6 illustrates another embodiment of the dispenser with a tapered container.

FIG. 6 illustrates another embodiment of the dispenser with a tapered container 20. In particular, the sides of the container are tapered so that the diameter of the container near the outlet 24 is larger than the diameter near the inlet 22. Thus, the sides of the container 20 are slightly cone shaped. In this embodiment, when the piston 40 is near the inlet 22, as in a storage/stowage situation, the sealing effectiveness is very high. As the piston 40 moves toward the outlet 24, the container diameter grows slightly larger and the resulting friction between the piston seal and the container grows smaller which minimizes the pressure drop due to piston friction. Otherwise, the dispenser with this container operates similarly to the dispenser shown in FIGS. 3-5.

Figure 7:
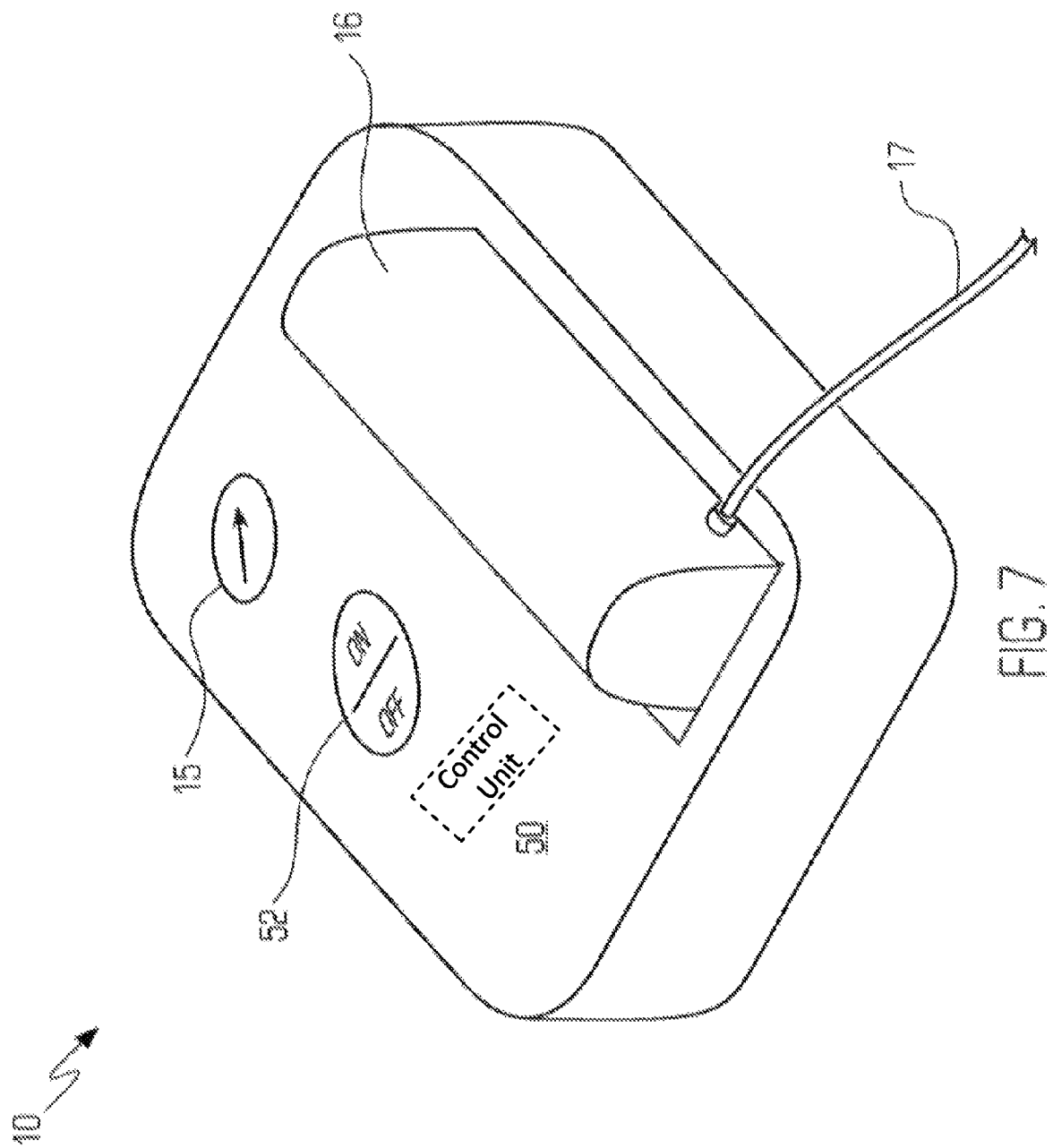
FIG. 7 illustrates another embodiment of a kit that seals and inflates an inflatable structure.

FIG. 7 illustrates another embodiment of a kit 10 that seals and inflates an inflatable structure. In this embodiment, the kit 10 may have a housing 50 that houses the source of compressed air 14, the power source and the dispenser 16 in a single unit. The housing may also have the gauge 15 as well as a mode switch 52, such as an ON/OFF switch as shown.

In the kit 10, the pressure drop is compensated. The compensation of the pressure drop results in a very accurate pressure gauge 15 associated with the kit so that a user of the kit can inflate their inflatable structure, such as a vehicle tire, to the proper pressure. The user will be safe because their tire will be properly inflated and will increase fuel efficiency due to properly inflated tires. The pressure of the inflatable structure may be measured using a handheld gauge or an internal gauge in a compressor. The kit may include a control unit having a processing unit and a memory and the processing unit, based on a plurality of instructions contained in the memory, controls the operation of the compressor unit 14 which includes the operation of the pressure gauge 15 and the operation of the pump 20 based on the on/off/mode of operation switch 52. The memory and/or processing unit may also contain a compensation factor that is applied to the pressure gauge 15 to adjust its display (as shown by the dotted arrow) based on a known pressure drop of the kit, such as due to the tire valve, the dispenser when empty, etc. The compensation factor is a known value that is generated based on testing of the kit before sale. Thus, the pressure gauge 15 is more accurate and therefore allows the user to inflate the inflatable structure to the proper pressure. In particular, the compensation factor increases the pressure reading on the pressure gauge (by a predetermined amount such as 8 psi) to compensate for the pressure drop and accurately reflect the actual pressure reading inside the inflatable structure.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A sealant dispenser, comprising:
   a container having an inlet that is capable of containing a sealant material;
   an outlet of the container having an outlet seal;
   a piston inside of the container having a seal wherein the piston is capable of moving from the inlet towards to outlet when pushed by a pressurized air stream entering the inlet, the piston having a width that is smaller than a width of the outlet seal to allow pressurized air to flow out through the outlet seal around the piston; and
   wherein the outlet seal and the piston seal prevent sealant material from leaking from the container when it is filled with sealant material.

2. The dispenser of claim 1, wherein the container has cylindrical walls.

3. The dispenser of claim 1, wherein the container has tapered walls.

4. The dispenser of claim 3, wherein the tapered walls have a diameter at the inlet and a larger diameter at the outlet.

5. The dispenser of claim 1, wherein the piston seal is an O-ring.

6. The dispenser of claim 1, wherein the outlet seal is a disc seal.

7. The dispenser of claim 6, wherein the disc seal is rubber.

8. The dispenser of claim 1, wherein the inlet and outlet are at opposite ends of the container.

9. A kit, comprising:
   a compressor unit that is capable of generating compressed air;
   a container having an inlet wherein the container is capable of holding a sealing material;
   an outlet of the container having an outlet seal;
   a piston inside of the container having a seal wherein the piston is capable of moving from the inlet towards to outlet when pushed by a pressurized air stream entering the inlet, the piston having a width that is smaller than a width of the outlet seal to allow pressurized air to flow out through the outlet seal around the piston; and
   wherein the outlet seal and the piston seal prevent sealant material from leaking from the container when it is filled with sealant material.

10. The kit of claim 9, wherein the container has cylindrical walls.

11. The kit of claim 9, wherein the container has tapered walls.

12. The kit of claim 11, wherein the tapered walls have a diameter at the inlet and a larger diameter at the outlet.

13. The kit of claim 9, wherein the piston seal is an O-ring.

14. The kit of claim 9, wherein the outlet seal is a disc seal.

15. The kit of claim 14, wherein the disc seal is rubber.

16. The kit of claim 9, wherein the inlet and outlet are at opposite ends of the container.

17. The kit of claim 9 further comprising a gauge that is capable of displaying a pressure of an inflatable structure and a control unit that compensates for a pressure drop in the kit and adjusts the gauge to account for the pressure drop.

18. The kit of claim 9 further comprising a housing that contains the compressor unit and the container.

19. A method for dispensing sealant from a container, comprising:

injecting pressurized air into a container that contains a sealant material;

moving, using the pressurized air, a piston inside of the container to build up pressure in the container;

forcing open an outlet seal once the pressure builds up in the container;

releasing the sealant material once the outlet seal is open; and releasing the pressurized air around the outlet seal since a width of the piston is less than a width of the outlet seal.

* * * * *